(12) United States Patent
Pfaffelhuber (10) Patent No.: US 10,196,012 B2
(45) Date of Patent: Feb. 5, 2019

(54) VEHICLE FLOOR ARRANGEMENT

(71) Applicant: Röchling Automotive SE & Co. KG, Mannheim (DE)

(72) Inventor: Klaus Pfaffelhuber, Augsburg (DE)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 119 days.

(21) Appl. No.: 15/282,188

(22) Filed: Sep. 30, 2016

(65) Prior Publication Data
US 2017/0088064 A1 Mar. 30, 2017

(30) Foreign Application Priority Data

Sep. 30, 2015 (DE) ........................ 10 2015 218 974

(51) Int. Cl.
*B60R 13/08* (2006.01)
*B62D 25/20* (2006.01)

(52) U.S. Cl.
CPC .......... *B60R 13/0861* (2013.01); *B60R 13/08* (2013.01); *B62D 25/20* (2013.01)

(58) Field of Classification Search
CPC ............................. B60R 13/08; B60R 13/0861
USPC ....................................................... 296/39.3
See application file for complete search history.

(56) References Cited

U.S. PATENT DOCUMENTS

| | | | | |
|---|---|---|---|---|
| 8,382,184 B2 * | 2/2013 | Mizata | ...................... | B32B 3/26 296/39.3 |
| 2008/0203751 A1 * | 8/2008 | Wildhaber | .......... | B60R 13/0838 296/39.3 |
| 2010/0013255 A1 * | 1/2010 | Mantovani | .......... | B60R 13/0861 296/1.03 |
| 2010/0066121 A1 * | 3/2010 | Gross | ................... | G10K 11/162 296/146.5 |
| 2010/0219561 A1 * | 9/2010 | Pfaffelhuber | ......... | B29C 43/006 264/320 |
| 2011/0139542 A1 * | 6/2011 | Borroni | ................... | B32B 3/266 181/290 |
| 2014/0050886 A1 | 2/2014 | Burgin et al. | | |
| 2014/0070562 A1 * | 3/2014 | Inagaki | ................... | B32B 5/022 296/180.1 |
| 2014/0342138 A1 | 11/2014 | Rondeau et al. | | |

FOREIGN PATENT DOCUMENTS

| | | | |
|---|---|---|---|
| DE | 10 2014 203 053 A1 | 8/2015 |
| WO | 2012/126763 A2 | 9/2012 |

OTHER PUBLICATIONS

Search Report issued for German Patent Application No. 10 2015 218 974.0 dated Sep. 8, 2016 with machine English translation (17 pages).

* cited by examiner

*Primary Examiner* — Jason S Daniels
(74) *Attorney, Agent, or Firm* — Prince Lobel Tye LLP (57) ABSTRACT

A vehicle floor arrangement comprises a vehicle floor as well as a sound insulating arrangement covering at least in part, preferentially entirely, the vehicle floor, wherein the sound insulating arrangement at least in sections, preferentially entirely, comprises a sound insulating component formed at least in sections, preferentially entirely, of a thermoplastically bonded fiber structure that is in part, preferentially entirely porous, as well as a second sound insulating component configured separately from the first sound insulating component, which second insulating component is arranged between the first sound insulating component and the vehicle floor.

19 Claims, 5 Drawing Sheets

VEHICLE FLOOR ARRANGEMENT

CROSS REFERENCE TO RELATED APPLICATION(S)

This application claims priority to German Application No. 10 2015 218 974.0, filed Sep. 30, 2015. The entirety of the disclosure of the above-referenced application is incorporated herein by reference.

BACKGROUND OF THE INVENTION

Field of the Invention

The present invention relates to a vehicle floor arrangement comprising: a vehicle floor as well as a sound insulating arrangement which at least in part, preferentially entirely, covers the vehicle floor.

Sound insulating arrangements of this type are used to insulate structure-borne sound spreading over the vehicle floor, as well as, for example, air-borne sound generated during a drive, and are in general made of a plurality of materials, such as polyurethane foam, plastic foils or bitumen layers. The disadvantages of the known sound insulating arrangements are, however, the high weight associated with this choice of materials and the only very limited possibility of recycling the materials included in sound insulating arrangements of this type because of the combination of many different materials.

SUMMARY OF THE INVENTION

Taking into consideration these disadvantages, it is the object of the present invention to provide a vehicle floor defined above, in which the sound insulating arrangement is characterized by a low weight and improved recyclability in comparison with the known sound insulating arrangements.

According to the present invention, this object is attained by a vehicle floor arrangement of the type defined above, in which the sound insulating arrangement comprises: a, at least in sections, porous first sound insulating component formed of a fiber structure that is thermoplastically bonded, at least in sections, as well as a second sound insulating component arranged between the first sound insulating component and the vehicle floor, the second sound insulating component being configured separately from the first sound insulating component In a vehicle floor arrangement according to the present invention, the first sound insulating component is primarily used for insulating air-borne sound generated at frequencies above 500 Hz during a drive, while, depending on the arrangement, the second sound insulating component is used for antidrumming, i.e. insulating structure-borne sound spreading over the vehicle floor at less than 500 Hz, as well as for insulating air-borne sound spreading in the flat space between the vehicle floor and the first sound insulating component.

By means of the, at least in sections, porous configuration of the first noise insulating component it can be provided with a lower weight. In this case, porosity is to be understood as the ratio of the pore space volume to the total volume of a component. A particularly low weight of the first sound insulating component can be ensured in that the entire first sound insulating component is porous. The weight of the first sound insulating component can also be influenced by the choice of the thermoplastic binding agent. A plastic binding agent comprising a polyolefin, such as polypropylene, is conceivable. Basically any material whose melting or softening point is higher than the melting or softening point of the plastic binding agent can be considered for the fiber material. The fiber material can for example comprise glass fibers, mineral fibers or plastic fibers. The first sound insulating component is preferentially formed of a thermoplastically bonded fiber structure.

In that the first and the second sound insulating components are configured separately from one another, they can also be recycled independently of one another. It is therefore possible to select the materials for the respective sound insulating components independently of one another, depending on the frequencies to be insulated by the respective components.

As a further development of the invention, it can be provided that the first sound insulating component and/or the second sound insulating component is/are configured flat. "Flat" in this case means that the first sound insulating component and/or the second insulating component have a larger extension in the orthogonal direction than in a third direction relative to these directions. This embodiment ultimately allows a material-saving design with a low weight because, compared to a non-flat sound insulating component of the same weight, a flat sound insulating component can cover a larger area of the vehicle floor and therefore ensure an accordingly larger surface area for sound insulation.

In a preferred embodiment, the first and second sound insulating components are provided flat and essentially parallel to one another. As a result of the parallel arrangement of the first and second sound insulating component it is in particular possible to ensure that a uniform sound insulating arrangement can be provided in the area of the vehicle floor covered by the sound insulating arrangement if the first and second sound insulating arrangements respectively have a uniform thickness.

Independently of the actual configuration of the first and second sound insulating component, it is advantageous if the first sound insulating component at least in part, preferentially entirely, covers the second sound insulating component because, as a result of this, the second sound insulating component can at least in part be shielded from external influences.

In order to provide a second sound insulating component with a low weight it can further be provided that the second sound insulating component is at least in part formed of a fiber material. This can comprise a fiber web mat, for example, such as a fleece mat or felt mat, formed of a thermoplastic fiber material such as like PET. Owing to its porous structure, a fiber web mat of this type is especially suitable for insulating low frequencies. In this connection, an especially low weight can be achieved in that the second sound insulating component is entirely formed of a porous fiber material without additional binding material. It can also be advantageous, however, to form the second sound insulating component at least in part, preferentially entirely, of a thermoplastically bonded fiber material, possibly to specifically influence the mechanical properties of the second sound insulating component. This embodiment, in particular, offers the possibility of producing the first and the second sound insulating component from the same material, so that they can also be recycled together, as a result of which simple recyclability can be ensured. An especially low weight in this case can be achieved in that the second sound insulating component is at least in part, preferably entirely, porous. In order that the first and the second sound insulating components have a different sound insulating behavior, it is preferred that the second sound insulating component have a porosity that is different from that of the first sound insulating component. A different sound insulating behavior can alternatively or additionally be effected by a different weight per unit area or/and a different fiber material or/and different average fiber lengths or/and different average fiber densities or/and different thermoplastic binding agents.

As a further development of the invention, it can be provided that an air gap is provided between the first sound insulating component and the vehicle floor. This air gap preferentially is closed off by the first sound insulating component and the vehicle floor by forming a gap space relative to the external environment. An air gap can act as a sound insulating cavity and therefore contribute as such to the sound insulation of the sound insulating arrangement. Furthermore, this embodiment also provides different possible arrangements for the second sound insulating component inside the air gap, as a result of which the sound insulating characteristic of the sound insulating arrangement can specifically be influenced.

In this connection, the second sound insulating component can, at least in sections, preferentially entirely, abut against the first sound insulating component and preferentially at least in sections, preferably entirely, be spaced apart from the vehicle floor. This design is ideal, for example, if the first sound insulating component abuts below the second sound insulating component in the direction of gravity because the second sound insulating component can then be positioned without further fastening means between the vehicle floor and the first sound insulating component in a defined manner, which ultimately contributes to a simple overall design.

Alternatively, the first sound insulating component can also at least in sections abut against the vehicle floor and preferentially at least in sections, preferably entirely, be spaced apart from the first sound insulating component. This embodiment allows an especially good insulation of low frequency structure-borne sound spreading over the vehicle floor. In this case, an especially good structure-borne sound insulation can be achieved in that the second sound insulating component entirely abuts against the vehicle floor. The second sound insulating component is preferably molded onto the vehicle floor, possibly with an intermediate arrangement of an adhesive agent layer, as a result of which firm adhesion of the second sound insulating component to the vehicle floor can be ensured without further fastening means.

As a further alternative, it can be provided that the second sound insulating component at least in sections, preferentially entirely, abuts neither against the vehicle floor nor against the first sound insulating component, so that the second sound insulating component at least in sections, or even entirely, is spaced apart from the vehicle floor as well as from the first sound insulating component. With this embodiment, an extensive abutment surface can be avoided between the second sound insulating component on the one hand and the vehicle floor or the first sound insulating component on the other hand, which for example can prevent thermally induced strains between the respective components if the components have thermal expansion behaviors essentially different from one another.

Independently of how the second sound insulating component is configured, the sound insulation capacity of the sound insulating arrangement can also be influenced by the volume occupied by the second sound insulating component between the vehicle floor and the first sound insulating component. In particular, if the second sound insulating component comprises a material having a high porosity, it can be advantageous if the second sound insulating component fills the space between the first sound insulating component and the vehicle floor by at least 30%. Thus with this embodiment an air gap exists between the vehicle floor and the first sound insulating component, which in turn can contribute to the sound insulation depending on its geometry. If the second sound insulating component comprises a material having an especially high porosity, it can be advantageous if the second sound insulating component fills the space between the vehicle floor and the first sound insulating component by at least 70% or even entirely. If the second sound insulating component entirely fills the space between the vehicle floor and the first sound insulating component, the second sound insulating component will abut against the first sound insulating component as well as against the vehicle floor. In this case, the second sound insulating component can of course also be molded onto the vehicle floor.

As a further development of the invention, it can be provided that the first sound insulating component or/and the second sound insulating component has/have a multilayer configuration. As a result of this, the acoustic insulation behavior of the respective sound insulating component can be influenced by the specific layer sequence. The first or/and the second sound insulating component can in this case comprise at least one foil length, which can for example be configured as a covering layer and be used as a mechanical protective layer against stone impacts, for example. The foil layer preferably also has thermal or/and acoustic isolating properties.

The foil layer can, at least in sections, preferentially entirely, be formed as a metal foil, possibly of aluminum. If the metal foil is configured as a covering layer, it is advantageous if it is perforated, in particular microperforated, in order allow the passage of sound through the metal foil. In this connection, perforation is to be understood as throughholes or slots provided in the metal foil. In a microperforation, the hole diameters or the slot widths measure less than 1 mm, preferentially no more than 0.5 mm, wherein the hole diameters as well as the slot widths or the hole or slot separations can be selected depending on the acoustic frequencies to be expected in order to achieve an optimal sound transmission through the metal foil. The hole and slot separations can be selected, in particular, such that fluids such as vehicle operating fluids or rainwater, cannot pass through the metal foil owing to their surface tension, whereas the passage of sound is possible.

Even if a second sound insulating material formed of fiber material is suitable for insulating low frequencies, alternatively configured second sound insulating components should not be excluded. The sound insulating component can comprise, for example, at least one sound insulating cavity, which preferably comprises a plurality of cavities that preferentially are open at least in part in order to facilitate the entry of sound into a cavity compared with a hermetically closed cavity. The use of cavities in particular offers the possibility to influence the sound insulating characteristic of the sound insulating arrangement by the geometry of the at least one cavity as well as the material of the walls that limit it. If the cavity has an opening, the corresponding cavity can be arranged between the vehicle and the first sound insulating component such that the opening faces the vehicle floor or the first sound insulating component. In this case one might also consider positioning the corresponding cavity with a side having an opening abutting against the vehicle floor or against the first sound insulating component in order to facilitate the entry of sound into the cavity from the vehicle floor or from the first sound insulating component.

Furthermore, in this case consideration might also be given to produce the walls bounding a cavity from a material formed of a thermoplastically bonded fiber structure in order to achieve an especially effective insulation of low-frequency sound.

It should basically not be ruled out that the sound insulating arrangement extends along one side of the vehicle floor, which, in a vehicle in the assembled state, is the side facing the passenger cell. However in order to, in particular, insulate air-borne sound, which is generated for example by the interaction of the wheels of the vehicle with the pavement; it is preferred that the sound insulating arrangement is at least in part, preferentially entirely, arranged on one side of the vehicle floor which, in a vehicle in the assembled state, is the side facing away from the passenger cell, for an effective insulation. This embodiment not only ensures an effective sound insulation in the passenger cabin, but also in the environment of a vehicle having a sound insulating arrangement of this type.

In another aspect, the present invention relates to a vehicle comprising a vehicle floor arrangement according to the present invention.

BRIEF DESCRIPTION OF THE DRAWING FIGURES

The present invention will be explained in more detail below with reference to the attached figures, which show:

FIG. 1 shows a vehicle floor arrangement 10 according to a first embodiment of the invention, comprising a vehicle floor 12, as well as a sound insulating arrangement 14 covering the vehicle floor 12 at least in part. The sound insulating arrangement 14 comprises a first sound insulating component 16 formed at least in part, preferentially entirely, of a thermoplastically bonded fiber structure that is at least in part, preferentially entirely porous, as well as a sound insulating component 18 arranged between the first sound insulating component 16 and the vehicle floor 12, which sound insulating component 16 is configured separately from the first sound insulating component The sound insulating arrangement 14 is in general used to insulate structure-borne sound spreading over the vehicle floor as well as, for example, air-borne sound generated during a drive. In the vehicle floor arrangement 10 shown in FIG. 1, the first sound insulating component 16 is used primarily for insulating sound at frequencies above 500 Hz, while the second sound insulating component 18 is primarily used for antidrumming, i.e. the insulation of low frequencies in a range of less than 500 Hz.

Figure 1:
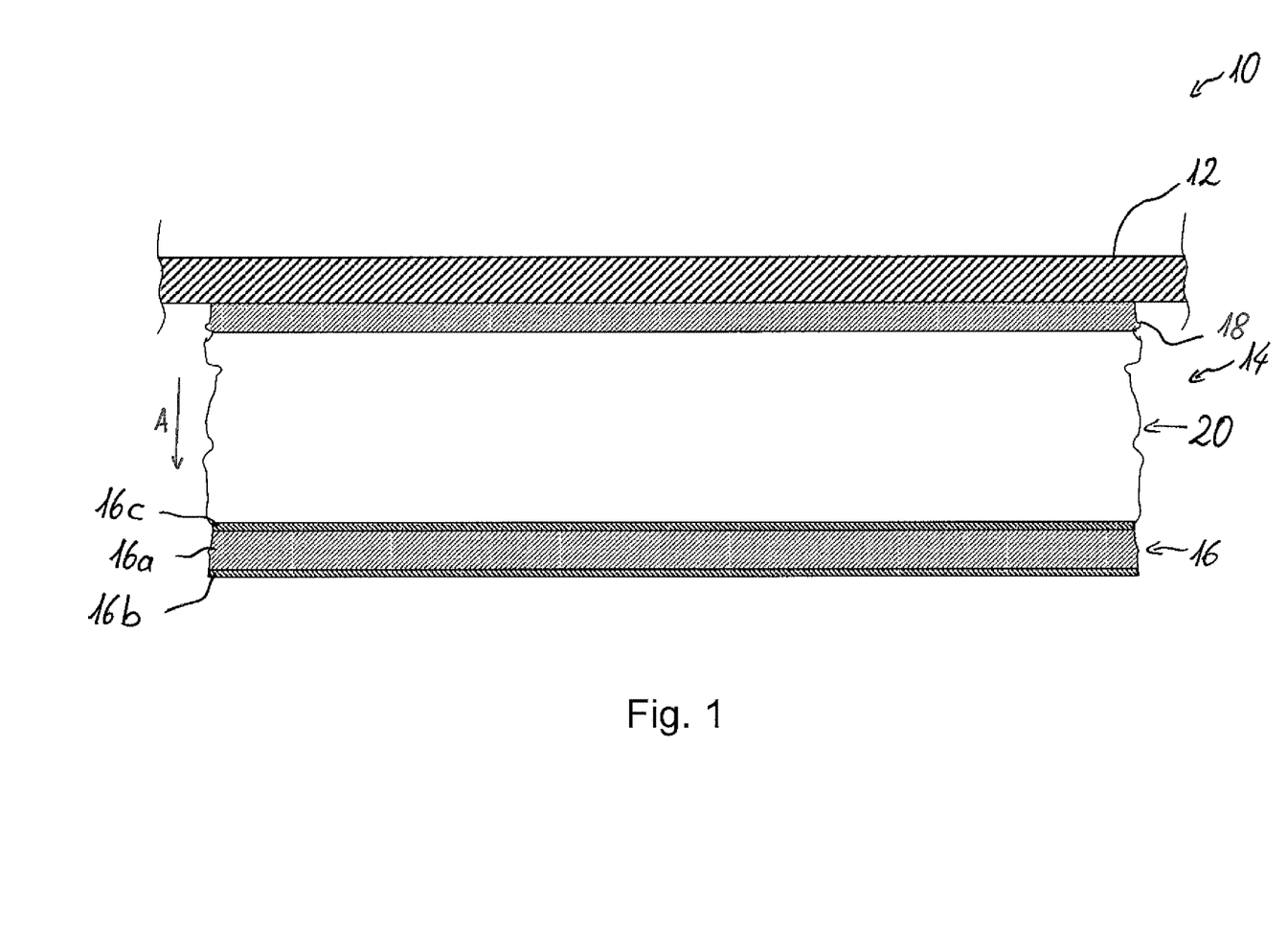
FIG. 1 a sectional view of a vehicle floor arrangement according to a first embodiment of the invention, FIG. 2 a sectional view of a vehicle floor arrangement according to a second embodiment of the invention, FIG. 3 a sectional view of a vehicle floor arrangement according to a third embodiment of the invention, FIG. 4 a sectional view of a vehicle floor arrangement according to a fourth embodiment of the invention and FIG. 5 a sectional view of a vehicle floor arrangement according to a fifth embodiment of the invention.

By means of the, at least in sections, porous configuration of the first sound insulating component 16, the latter can be provided with a lower weight. In this case, porosity is to be understood as the ratio of the cavity space volume to the total volume of a component. A particularly low weight of the first sound insulating component 16 can be ensured in that it has a completely porous configuration. The weight of the first sound insulating component 16 can also be influenced by the choice of the thermoplastic binding agent. A plastic binding agent comprising a polyolefin, such as polypropylene, is conceivable. Basically any material whose melting or softening point is higher than the melting or softening point of the plastic binding agent is conceivable as fiber material. The fiber material, for example, can comprise: glass fibers, mineral fibers, or plastic fibers.

Since that the first sound insulating component 16 and the second sound insulating component 18 are configured separately from one another, they can also be recycled independently of one another. It is therefore possible to select the materials for the respective sound insulating components 16, 18 independently of one another depending on the frequencies to be insulated by the respective components.

As shown in FIG. 1, the first and the second sound insulating components 16 and 18 are flat and arranged essentially parallel to one another. "Flat" in this case means that the first sound insulating component 16 or the second insulating component 18 has a larger extension in two directions that are orthogonal to one another than in a third direction relative to these directions. In this sense, the third direction in this embodiment corresponds to the spacing direction between the vehicle floor 12 and the first sound insulating component 16 and is designated with the reference numeral A in FIG. 1. This embodiment ultimately allows a material-saving design with a low weight because, compared to a non-flat sound insulating component of the same weight, a flat sound insulating component can cover a larger area of the vehicle floor 12 and therefore ensure an accordingly larger surface area for sound insulation.

In order to shield the second sound insulating component 18 from external influences, it is preferred that the first sound insulating component 16 at least covers the second sound insulating component 18, as shown in FIG. 1. This arrangement is in particular convenient if the first and second sound insulating components 16 and 18 are arranged on one side of the vehicle floor 12 which, in a vehicle in the assembled state, is the side facing away from the passenger cell.

The second sound insulating component 18 can also be formed of fiber material and at least in part, preferentially entirely, can be porous. A sound insulating arrangement 14 with an overall lower weight can thus be provided. The fiber material can also be thermoplastically bonded. In order that the first and the second sound insulating component 16 and 18 have a different sound insulating behavior, it is preferred that the second sound insulating component 18 has a porosity that is different from that of the first sound insulating component 16. A different sound insulating behavior can alternatively or additionally be realized by a different weight per unit area, a different fiber material, different fiber lengths, or different thermoplastic binding agents.

In this embodiment, an air gap 20 is provided between the first sound insulating component 16 and the vehicle floor 12, in which air gap 20 the second sound insulating component is arranged. In this case, the second sound insulating component 18 essentially entirely abuts against the vehicle floor 12. In this connection, the second sound insulating component 18 is molded onto the vehicle floor 12, which in particular ensures a firm support of the second sound insulating component 18 on the vehicle floor 12 without additional fastening elements.

In the sound insulating arrangement 14 shown in FIG. 1, the first sound insulating component 16 has a multilayer configuration and comprises a porous core layer 16a formed of a thermoplastically bonded fiber structure, as well as of two covering layers 16b, 16c, possibly configured as foil layers, receiving the core layer between them. The outer core layer 16b can for example be used as a protective layer, possibly against stone impact. The foil layers 16b, 16c have thermal or/and acoustic isolating properties.

At least one, preferentially both covering layers 16b, 16c, can at least in sections, preferentially entirely, be configured as a metal foil, preferably of aluminum. At least one of the covering layers 16b, 16c is preferably perforated, in particular microperforated in order to allow the passage of sound through the metal foil 16b, 16c. In this connection, perforation is to be understood as through-holes or slots provided in the metal foil 16b, 16c. In a microperforation, the hole diameters or the slot widths measure less than 1 mm, wherein the hole diameters as well as the slot widths or the hole or slot separations can be selected depending on the acoustic frequencies to be expected in order to achieve an optimal sound transmission through the core foil 16a. The hole and slot separations can in particular be selected such that fluids such as vehicle operating fluids or rainwater cannot pass through the metal foils 16b, 16c owing to their surface tension, while the passage of sound is possible.

Figure 2:
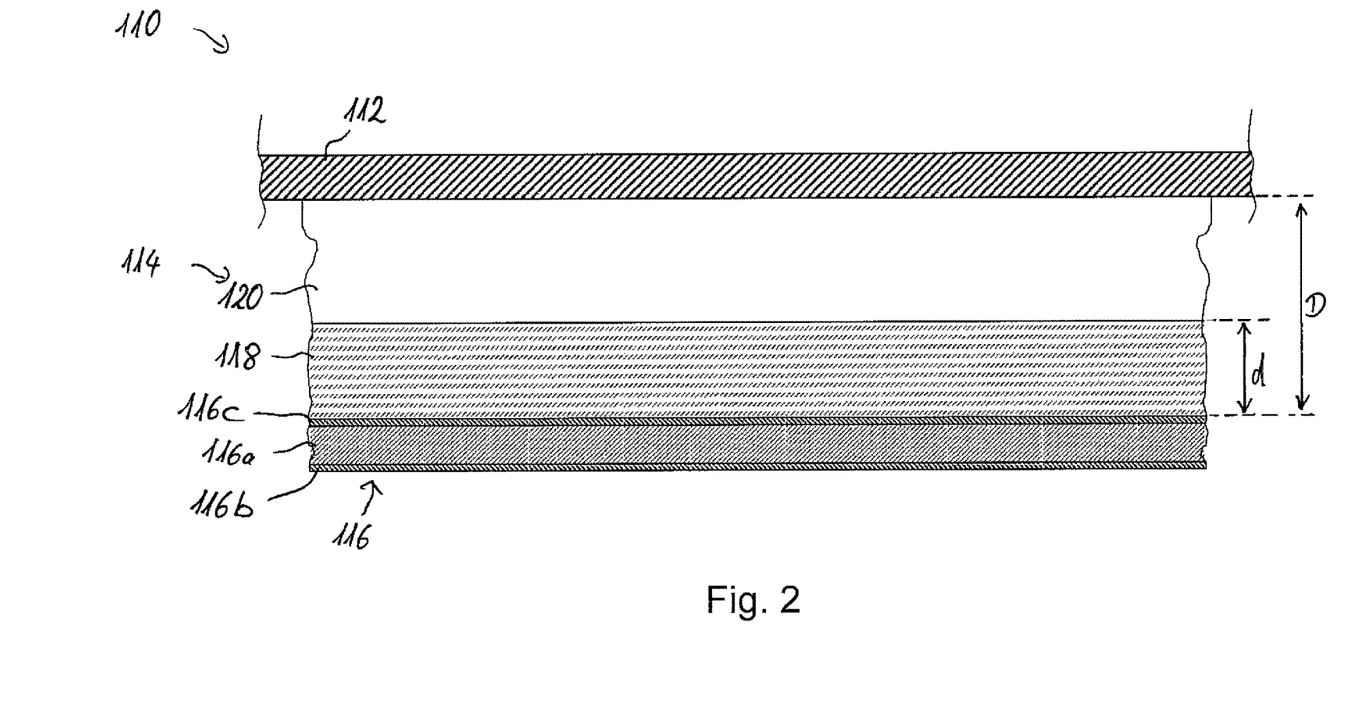

FIG. 2 shows a vehicle floor arrangement according to a second embodiment of the present invention. The second embodiment will only be described to the extent that it differs from the first embodiment, to whose description is otherwise referred. In the description of the second embodiment, like and functionally similar components and component sections to those in the first embodiment are provided with the same reference numeral, but increased by 100 with respect to the corresponding components and component sections of the vehicle floor arrangement 10 according to the first embodiment.

The vehicle floor arrangement 110 according to the second embodiment shown in FIG. 2 comprises a vehicle floor 112 and a sound insulating arrangement 114 at least in part covering the vehicle floor 112 having a first sound insulating component 116 and a second sound insulating component 118. The first sound insulating component 116 has a multilayer configuration and comprises a core layer 116a and two core layers 116b, 116c receiving the core layer 116a between them.

The vehicle floor arrangement 110 according to the second embodiment differs from that according to the first embodiment in that the second sound insulating component 118 abuts against the first sound insulating component 116. In this embodiment, the second sound insulating component 118 is also arranged between an air gap 120 formed between the vehicle floor 112 and the first sound insulating component 116.

This design is in particular characterized in that for a defined attachment of the second sound insulating component 118 no special fastening devices are provided, so that the vehicle floor arrangement 110 according to the second embodiment is therefore especially simple. Contrary to the first embodiment, the second sound insulating component 118 is at least in part, preferentially entirely, configured as a fiber mat, possibly made of thermoplastic fibers, in particular PET fibers. These fibers are not bonded thermoplastically, so that in comparison with the production of a sound insulating component of a thermoplastically bonded fiber structure, the production of a mat of this type is simplified.

The second sound insulating component 118 is also configured in the second embodiment as a flat component having an essentially constant thickness. The first sound insulating component 116 also has a flat configuration and essentially has a constant distance D from the vehicle floor 112. In the second embodiment, the thickness d of the second sound insulating component 116 is at least 30% of the distance D. Owing to the geometries of the first and second sound insulating components 116 and 118, as well as to their arrangement essentially parallel to the vehicle floor 112 selected in this case, the ratio thickness d to distance D corresponds to the volume fraction which the second sound insulating component 118 occupies in the space between the first sound insulating component 116 and the vehicle floor 112. As the ratio of the thickness d to distance D in this case is at least 30%, the second sound insulating component 118 consequently fills the space between the first sound insulating component 116 and the vehicle floor 112 by at least 30%. Such a high volume fraction can in particular, be advantageous if the second sound insulating component 118 has a high porosity.

Figure 3:
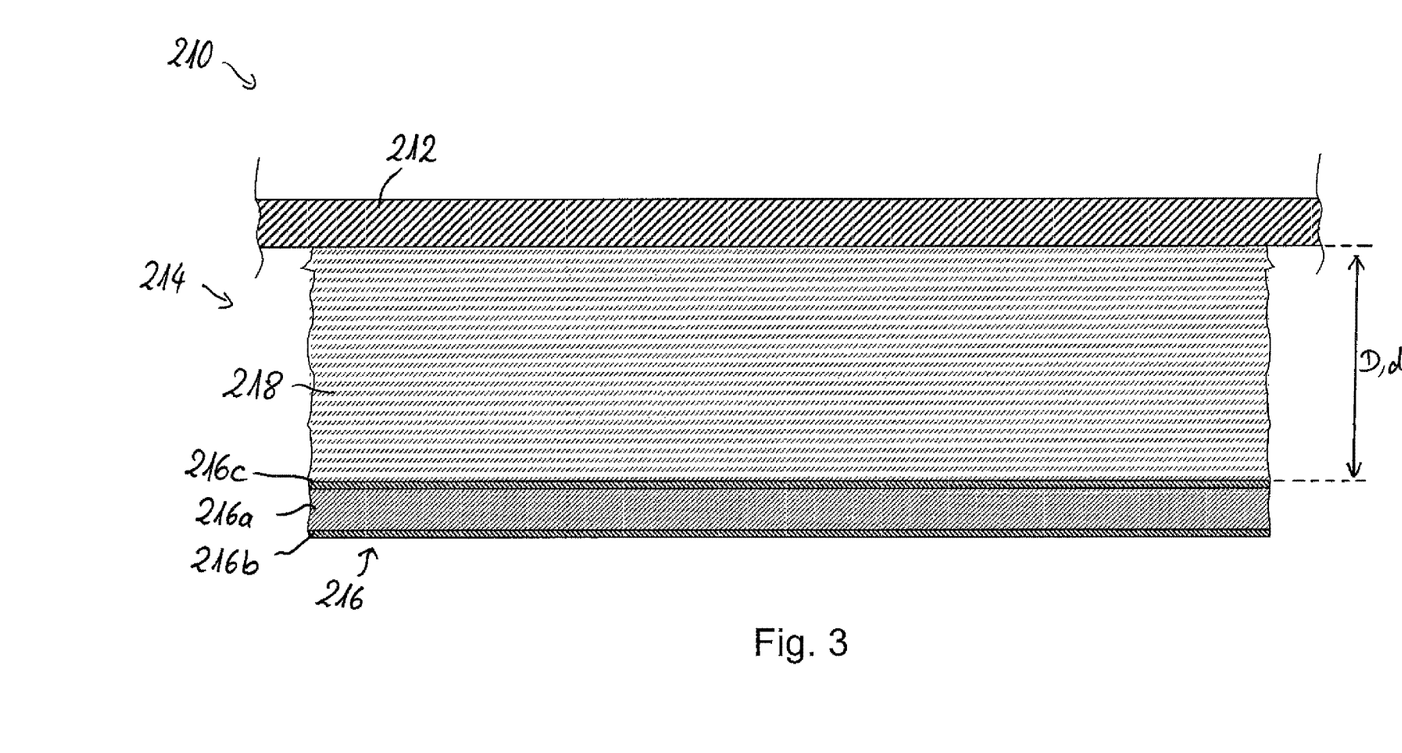

FIG. 3 shows a vehicle floor arrangement according to a second embodiment of the present invention. The third embodiment will only be described to the extent that it differs from the first embodiment and the second embodiment, to whose description reference is expressly made. In the description of the third embodiment, like components and functionally similar component sections to those in the first embodiment are provided with the same reference numeral increased, but increased 200 with respect to the corresponding components and component sections of the vehicle floor arrangement according to the first embodiment.

The vehicle floor arrangement 210 according to the third embodiment comprises a vehicle floor 212 as well as a sound insulating arrangement 214 covering the vehicle floor 212 at least in part, the sound insulating arrangement 214 having a first sound insulating component 216 and a second sound insulating component 218. The first sound insulating component 216 according to the third embodiment has a multilayer configuration and comprises a core layer 216a, as well as two covering layers 216b, 216c receiving the core layer 216a between them.

The vehicle floor arrangement 210 according to the third embodiment differs from the vehicle floor arrangement 110 according to the second embodiment in the thickness d' of the second sound insulating component 218, which essentially corresponds to the distance D between the vehicle floor 212 and the first sound insulating component 216. The second sound insulating component 218 in this case essentially entirely fills the space between the vehicle floor 212 and the first sound insulating component 216. This design is in particular advantageous if the second sound insulating component 218 has a very high porosity, for instance if it is provided as loose fiber mat.

Figure 4:
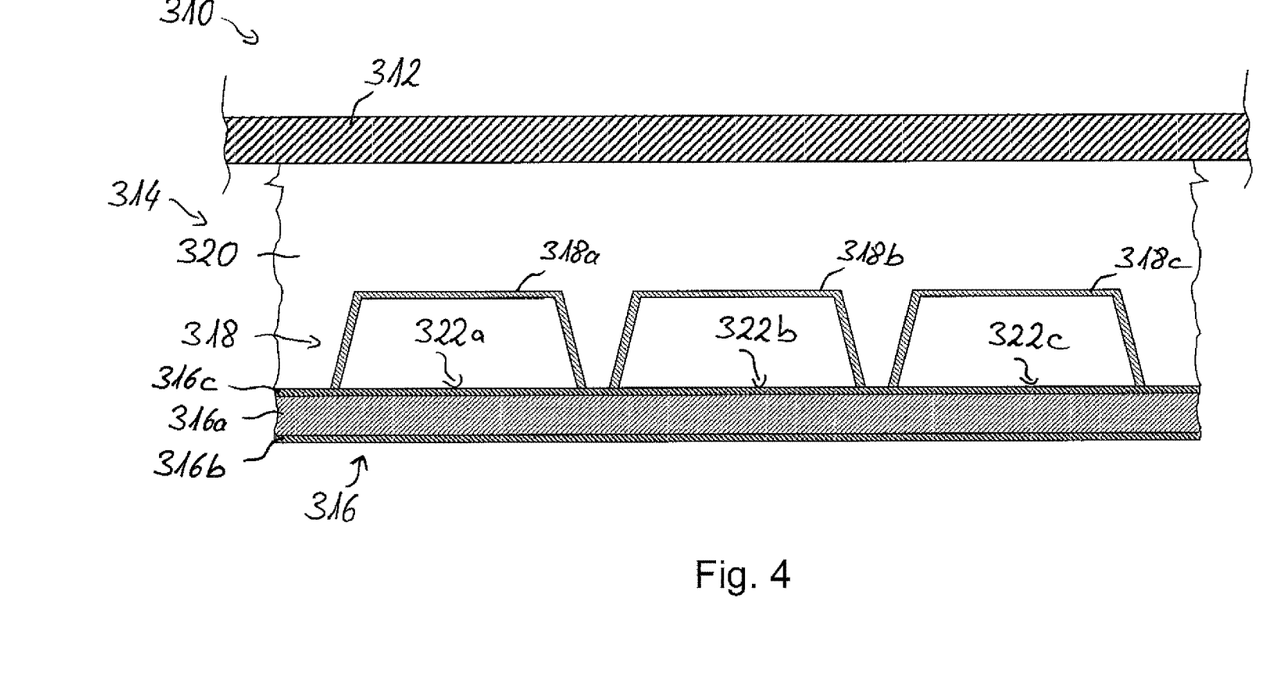

FIG. 4 shows a vehicle floor arrangement according to a fourth embodiment of the present invention. The fourth embodiment will only be described to the extent that it differs from the first embodiment, to whose description reference is otherwise made. In the description of third embodiment, like components and functionally similar component sections to those in the first embodiment are provided with the same reference numeral but increased by number 300 with respect to the corresponding components and component sections of the vehicle floor arrangement according to the first embodiment.

The vehicle floor arrangement 310 according to the fourth embodiment comprises a vehicle floor 312, as well as a sound insulating arrangement 314 having a first sound insulating component 316 and a second sound insulating component 318. The first sound insulating component 316 according to the fourth embodiment has a multilayer configuration and comprises a core layer 316a, as well as two covering layers 316b, 316c receiving the core layer 316a between them.

Contrary to the vehicle floor arrangements 10, 110, 210 according to the first three embodiments, the second sound insulating component 318 of the sound insulating arrangement 314 according to the fourth embodiment comprises a plurality of sound insulating cavities 318a, 318b, and 318c. Cavities are especially advantageous as sound insulators because their sound insulating characteristic can be influenced by their configuration as well as by the choice of the respective wall material.

In the present embodiment, the cavities 318a, 318b, 318c have an essentially similar shape. It should be explicitly noted at this point, however, that they can be configured with shapes that are different from one another. With regard to their arrangement between the vehicle floor 312 and the first sound insulating component 316, variations of the embodiment shown in FIG. 4 are also conceivable. While in this embodiment the cavities 318a, 318b, 318c abut against the first sound insulating component 316, embodiments are of course conceivable in which the cavities abut directly against a vehicle floor.

In order to facilitate the entry of sound into the cavities 318a, 318b, 318c shown in FIG. 4, they can have the openings 322a, 322b, and 322c respectively. In the exemplary embodiment shown in FIG. 4, the respective cavities 318a, 318b, 318c with the sides having the respective openings 322a, 322b, and 322c abut against the first sound insulating component 316. Consequently, the entry of sound into the respective cavities 318a, 318b, and 318c is facilitated via the sides facing the first sound insulating component 316.

Similarly to the first embodiment, an air gap 320 is provided in the vehicle floor arrangement 310 between the first sound insulating component and the vehicle floor 312, in which air gap 320 the second sound insulating component 318 is arranged.

Figure 5:
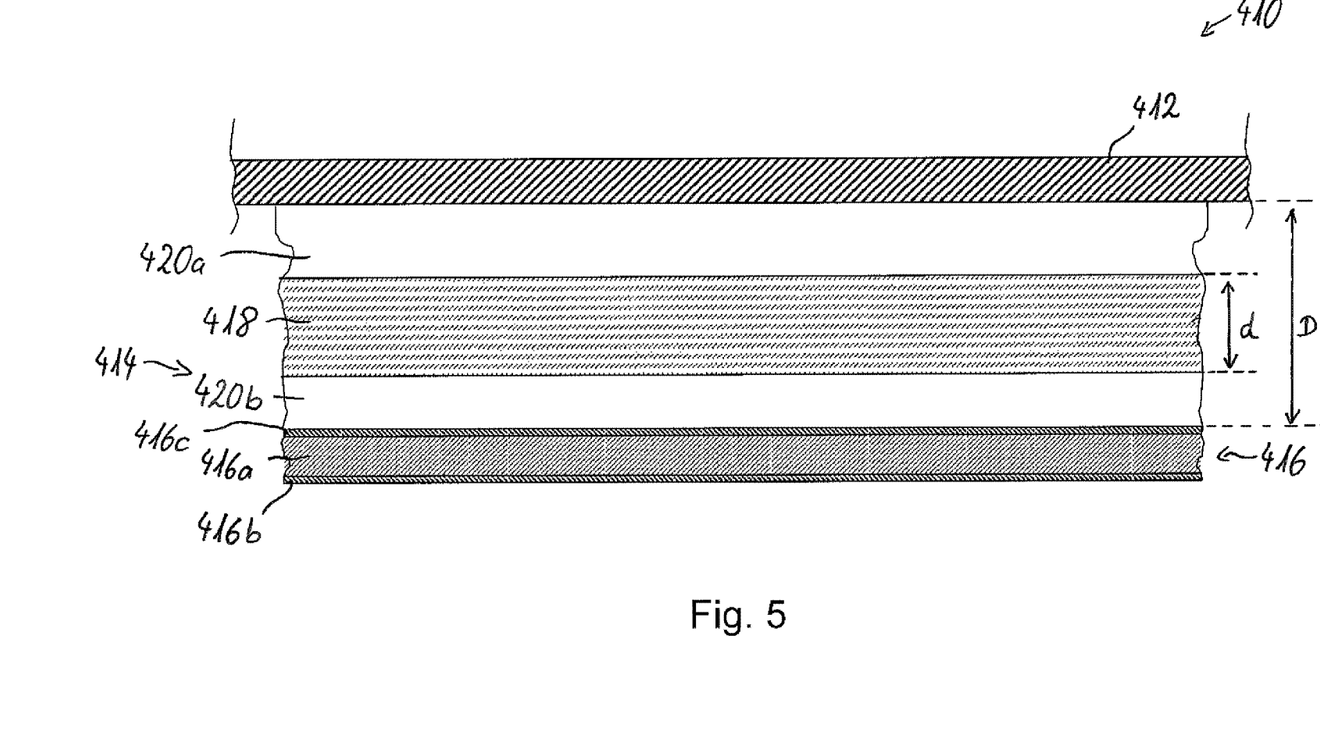

FIG. 5 shows a vehicle floor arrangement according to a fifth embodiment of the present invention. The fifth embodiment will only be described to the extent that it differs from the first to the fourth embodiments, to whose descriptions reference is otherwise made. In the description of the fifth embodiment, like components and functionally similar component sections similar to those in the first embodiment are provided with the same reference numeral but increased by 400 with respect to the corresponding components and component sections of the vehicle floor arrangement according to the first embodiment.

The vehicle floor arrangement 410 according to the third embodiment comprises a vehicle floor 412 as well as a sound insulating arrangement 414 covering the vehicle floor 412 at least in part, the sound insulating arrangement 414 having a first sound insulating component 416 and a second sound insulating component 418. The first sound insulating component 416 according to the fourth embodiment has a multilayer configuration and can comprise a core layer 416a as well as two covering layers 416b, 416c receiving the core layer 416a between them.

The vehicle floor arrangement 410 according to the fifth embodiment essentially corresponds to the vehicle floor arrangement 110 according to the second embodiment. This also means in particular that in this embodiment the thickness d of the second sound insulating component 418 is also smaller than the distance D of the first sound insulating component of the vehicle floor 412. Contrary to the second embodiment, in the vehicle floor arrangement 410 according to the fifth embodiment, the second sound insulating component 418 at least in sections, preferentially entirely, abuts against the vehicle floor 412 nor against the first sound insulating component 416, so that an air gap 420a and 420b can respectively be available between the vehicle floor 412 and the second sound insulating component 418, as well as between the second sound insulating component 418 and the first sound insulating component 416. With this embodiment, an extensive abutment surface can be avoided between the second sound insulating component 418 on the one hand and the vehicle floor 412, or between the first sound insulating component 416 on the other hand, which, for example, can prevent thermally induced strains between the respective components, if the components have thermal expansion behaviors essentially different from one another.

It should expressly be noted that the above-described embodiment can be combined as desired. A vehicle floor arrangement having a plurality of second sound insulating components can thus be conceived, possibly a second sound insulating component abutting against the vehicle floor and another against the first sound insulating component. Furthermore, sound insulating arrangements are also conceivable that have flat second sound insulating components, for example formed from fiber material, as well as second insulating components configured as cavities.

Moreover, sound insulating components comprising cavities, whose walls comprise a thermoplastically bonded, preferentially porous, fiber structure are conceivable.

The invention claimed is:

1. A vehicle floor arrangement comprising:
   a vehicle floor; and
   a sound insulating arrangement covering the vehicle floor;
   wherein the sound insulating arrangement comprises a first sound insulating component formed at least in sections of a thermoplastically bonded fiber structure, as well as a second sound insulating component, which is configured separately from the first sound insulating component, arranged between the first sound insulating component and the vehicle floor,
   wherein the first sound insulating component has a multilayer configuration and comprises a foil layer, wherein the second sound insulating component is at least in part formed of a thermoplastically bonded fiber material and is porous at least in part, and wherein the foil layer is arranged between the thermoplastically bonded fiber materials of the first and the second sound insulating component.

2. The vehicle floor arrangement according to claim 1, wherein the first sound insulating component or/and the second sound insulating component has or have a flat configuration.

3. The vehicle floor arrangement according to claim 2, wherein the first sound insulating component and the second sound insulating component have a flat configuration and are essentially parallel to one another.

4. A vehicle floor arrangement according to claim 1, wherein an air gap is provided between the first sound insulating component and the vehicle floor, wherein the second sound insulating component abuts against the first sound insulating component at least in sections or wherein the second sound insulating component abuts against the vehicle floor at least in sections, or wherein the second sound insulating component at least in sections abuts neither against the vehicle floor nor against the first sound insulating component.

5. A vehicle floor arrangement according to claim 4, wherein the second sound insulating component abuts against the first sound insulating component entirely or wherein the second sound insulating component abuts against the vehicle floor entirely, or is molded thereon.

6. The vehicle floor arrangement according to claim 1, wherein the second sound insulating component fills a space between the first sound insulating component and the vehicle floor by at least 30.

7. The vehicle floor arrangement according to claim 1, wherein the foil layer has thermal or/and acoustic insulation properties.

8. The vehicle floor arrangement according to claim 7, wherein the foil layer at least in sections is configured as a perforated metal foil.

9. The vehicle floor arrangement according to claim 1, wherein the second sound insulating component comprises at least one sound insulating cavity.

10. The vehicle floor arrangement according to claim 1, wherein the sound insulating arrangement is at least in part arranged on one side of the vehicle floor, which side, in a vehicle in the assembled state, is a side facing away from the passenger cell of the vehicle.

11. A vehicle comprising a vehicle floor arrangement according to claim 1.

12. A vehicle floor arrangement according to claim 1, wherein the sound insulating arrangement entirely covers the vehicle floor.

13. A vehicle floor arrangement according to claim 1, wherein the second sound insulating component is entirely formed of a thermoplastically bonded fiber material and is porous entirely.

14. The vehicle floor arrangement according to claim 1, wherein the second sound insulating component fills a space between first sound insulating component and the vehicle floor by at least 70%.

15. The vehicle floor arrangement according to claim 1, wherein the second sound insulating component entirely fills a space between first sound insulating component and the vehicle floor.

16. The vehicle floor arrangement according to claim 1, wherein the foil layer entirely is configured as a perforated metal foil.

17. The vehicle floor arrangement according to claim 16, wherein the at least one foil layer entirely is configured as a microperforated metal foil.

18. The vehicle floor arrangement according to claim 1, wherein the second sound insulating component comprises at least one at least partially open sound insulating cavity.

19. The vehicle floor arrangement according to claim 1, wherein the sound insulating arrangement is at entirely arranged on one side of the vehicle floor, which side, in a vehicle in the assembled state, is a side facing away from the passenger cell of the vehicle.

* * * * *